(12) United States Patent
Westerman

(10) Patent No.: US 9,311,528 B2
(45) Date of Patent: Apr. 12, 2016

(54) GESTURE LEARNING

(75) Inventor: Wayne Carl Westerman, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 2071 days.

(21) Appl. No.: 11/763,908

(22) Filed: Jun. 15, 2007

(65) Prior Publication Data

US 2008/0163130 A1 Jul. 3, 2008

Related U.S. Application Data

(63) Continuation-in-part of application No. 11/619,571, filed on Jan. 3, 2007, and a continuation-in-part of application No. 11/619,553, filed on Jan. 3, 2007, now Pat. No. 7,840,912.

(51) Int. Cl.
*G09B 21/00* (2006.01)
*G06K 9/00* (2006.01)
*G06F 3/0488* (2013.01)

(52) U.S. Cl.
CPC ........ *G06K 9/00355* (2013.01); *G06F 3/04883* (2013.01); *G06F 2203/04808* (2013.01)

(58) Field of Classification Search
USPC .......................................... 434/114, 156, 185
See application file for complete search history.

(56) References Cited

U.S. PATENT DOCUMENTS

| | | | |
|---|---|---|---|
| 5,236,199 A * | 8/1993 | Thompson, Jr. ................ | 463/41 |
| 5,252,951 A | 10/1993 | Tannenbaum et al. | |
| 5,379,057 A | 1/1995 | Clough et al. | |
| 5,473,705 A * | 12/1995 | Abe et al. ...................... | 382/100 |
| 5,483,261 A | 1/1996 | Yasutake | |
| 5,488,204 A | 1/1996 | Mead et al. | |
| 5,528,743 A * | 6/1996 | Tou et al. ....................... | 715/234 |
| 5,596,698 A * | 1/1997 | Morgan ......................... | 715/863 |
| 5,675,362 A | 10/1997 | Clough et al. | |
| 5,689,575 A * | 11/1997 | Sako et al. ..................... | 382/118 |
| 5,734,923 A * | 3/1998 | Sagawa et al. ................. | 715/204 |
| 5,741,136 A * | 4/1998 | Kirksey et al. ................ | 434/169 |
| 5,791,351 A * | 8/1998 | Curchod ........................ | 600/595 |

(Continued)

FOREIGN PATENT DOCUMENTS

| | | |
|---|---|---|
| EP | 0 689 124 A1 | 12/1995 |
| JP | 7-146750 A | 6/1995 |

(Continued)

OTHER PUBLICATIONS

International Search Report mailed May 14, 2008, for PCT Application No. PCT/US2007/089159, filed Dec. 28, 2007, two pages.

(Continued)

*Primary Examiner* — Robert J Utama
(74) *Attorney, Agent, or Firm* — Morrison & Foerster LLP

(57) ABSTRACT

Systems and methods that incorporate various techniques for teaching gestures to a user of a multi-touch sensitive device are disclosed herein. Such techniques can include presenting visible feedback of gestures, such as animated motion trails and/or hand motions, along with affirmative feedback for correctly performed gestures and negative feedback for incorrectly performed gestures. Such techniques can be expanded to provide training exercises that present tasks requiring a particular gesture or sequence of gestures to be performed. These training exercises can take the form of games or other engaging activities to encourage use.

60 Claims, 5 Drawing Sheets

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,116,907 A * | 9/2000 | Baker et al. | 434/156 |
| 6,147,678 A | 11/2000 | Kumar et al. | |
| 6,162,189 A * | 12/2000 | Girone et al. | 600/592 |
| 6,181,778 B1 * | 1/2001 | Ohki et al. | 379/52 |
| 6,188,391 B1 | 2/2001 | Seely et al. | |
| 6,268,857 B1 * | 7/2001 | Fishkin et al. | 715/863 |
| 6,297,838 B1 * | 10/2001 | Chang et al. | 715/863 |
| 6,310,610 B1 | 10/2001 | Beaton et al. | |
| 6,323,846 B1 * | 11/2001 | Westerman et al. | 345/173 |
| 6,337,678 B1 | 1/2002 | Fish | |
| 6,594,616 B2 | 7/2003 | Zhang et al. | |
| 6,690,387 B2 | 2/2004 | Zimmerman et al. | |
| 7,015,894 B2 | 3/2006 | Morohoshi | |
| 7,030,861 B1 | 4/2006 | Westerman et al. | |
| RE39,090 E | 5/2006 | Beauregard et al. | |
| 7,184,064 B2 | 2/2007 | Zimmerman et al. | |
| 7,249,950 B2 * | 7/2007 | Freeman et al. | 434/155 |
| RE40,153 E | 3/2008 | Westerman et al. | |
| 7,603,633 B2 | 10/2009 | Zhao et al. | |
| RE40,993 E | 11/2009 | Westerman | |
| 7,631,320 B2 | 12/2009 | Stern et al. | |
| 7,653,883 B2 | 1/2010 | Hotelling et al. | |
| 7,663,607 B2 | 2/2010 | Hotelling et al. | |
| 7,668,340 B2 | 2/2010 | Cohen et al. | |
| 7,721,264 B2 | 5/2010 | Peterson et al. | |
| 7,840,912 B2 | 11/2010 | Elias et al. | |
| 7,895,537 B2 | 2/2011 | Gruen et al. | |
| 7,907,141 B2 | 3/2011 | Saund | |
| 7,911,456 B2 | 3/2011 | Gillespie et al. | |
| 7,991,401 B2 | 8/2011 | Linder et al. | |
| 2002/0107556 A1 * | 8/2002 | Mcloul et al. | 607/48 |
| 2002/0140718 A1 | 10/2002 | Yan et al. | |
| 2003/0191779 A1 * | 10/2003 | Sagawa et al. | 707/104.1 |
| 2003/0222917 A1 | 12/2003 | Trantow | |
| 2004/0168149 A1 | 8/2004 | Nirell et al. | |
| 2004/0189720 A1 | 9/2004 | Wilson et al. | |
| 2004/0193413 A1 | 9/2004 | Wilson et al. | |
| 2005/0057524 A1 | 3/2005 | Hill et al. | |
| 2005/0210417 A1 | 9/2005 | Marvit et al. | |
| 2005/0210418 A1 * | 9/2005 | Marvit et al. | 715/863 |
| 2005/0212755 A1 | 9/2005 | Marvit | |
| 2006/0026521 A1 | 2/2006 | Hotelling et al. | |
| 2006/0026535 A1 | 2/2006 | Hotelling et al. | |
| 2006/0087510 A1 * | 4/2006 | Adamo-Villani et al. | 345/474 |
| 2006/0097991 A1 | 5/2006 | Hotelling et al. | |
| 2006/0101354 A1 | 5/2006 | Hashimoto et al. | |
| 2006/0125803 A1 | 6/2006 | Westerman et al. | |
| 2006/0134585 A1 * | 6/2006 | Adamo-Villani et al. | 434/112 |
| 2006/0197753 A1 | 9/2006 | Hotelling | |
| 2006/0209014 A1 | 9/2006 | Duncan et al. | |
| 2006/0209041 A1 * | 9/2006 | Studt et al. | 345/173 |
| 2006/0287617 A1 * | 12/2006 | Taub et al. | 601/24 |
| 2007/0177803 A1 | 8/2007 | Elias et al. | |
| 2007/0177804 A1 | 8/2007 | Elias et al. | |
| 2008/0089587 A1 | 4/2008 | Kim et al. | |
| 2008/0158168 A1 | 7/2008 | Westerman et al. | |
| 2008/0158172 A1 | 7/2008 | Hotelling et al. | |
| 2008/0191864 A1 * | 8/2008 | Wolfson | 340/524 |
| 2009/0178011 A1 | 7/2009 | Ording et al. | |
| 2009/0217211 A1 * | 8/2009 | Hildreth et al. | 715/863 |
| 2009/0228841 A1 * | 9/2009 | Hildreth | 715/863 |
| 2010/0031202 A1 | 2/2010 | Morris et al. | |
| 2010/0031203 A1 * | 2/2010 | Morris et al. | 715/863 |
| 2010/0134308 A1 * | 6/2010 | Barnardo et al. | 340/670 |
| 2010/0162181 A1 * | 6/2010 | Shiplacoff et al. | 715/863 |
| 2010/0164891 A1 * | 7/2010 | Hill et al. | 345/173 |

FOREIGN PATENT DOCUMENTS

| | | |
|---|---|---|
| JP | 2000/163031 A | 6/2000 |
| JP | 2002-259046 A | 9/2002 |
| JP | 2002/342033 A | 11/2002 |
| JP | 2005-293061 A | 10/2005 |
| WO | WO-2006/094308 A2 | 9/2006 |
| WO | WO-2006-094308 A3 | 9/2006 |
| WO | WO-2008/085783 A1 | 7/2008 |
| WO | WO-2008/085784 A2 | 7/2008 |

OTHER PUBLICATIONS

Final Office Action mailed Jan. 8, 2010, for U.S. Appl. No. 11/619,553, filed Jan. 3, 2007, 34 pages.

Non-Final Office Action mailed Apr. 2, 2009, for U.S. Appl. No. 11/619,553, filed Jan. 3, 2007, 41 pages.

Westerman, W. (Spring 1999). "Hand Tracking, Finger Identification, and Chordic Manipulation on a Multi-Touch Surface," Dissertation, University of Delaware, pp. 1-333.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Non-Final Office Action mailed Apr. 27, 2010, for U.S. Appl. No. 11/619,571, filed Jan. 3, 2007, 20 pages.

Rubine, D.H. (Dec. 1991). "The Automatic Recognition of Gestures," CMU-CS-91-202, Submitted in Partial Fulfillment of the Requirements of the Degree of Doctor of Philosophy in Computer Science at Carnegie Mellon University, 285 pages.

Rubine, D.H. (May 1992). "Combining Gestures and Direct Manipulation," CHI '92, pp. 659-660.

Non-Final Office Action mailed Oct. 4, 2010, for U.S. Appl. No. 11/619,571, filed Jan. 3, 2007, 19 pages.

Notice of Allowance mailed Jul. 9, 2010, for U.S. Appl. No. 11/619,553, filed Jan. 3, 2007, eight pages.

Anonymous. (2005). "Mouse Emulation—Gesture Guide," FingerWorks, located at <http://www.fingerworks.com/gesture_guide_mouse.html>, last visited Sep. 4, 2008, one page.

Anonymous. (2005). "MyGesture Editor—Gesture Mapping," located at <http://www.fingerworks.com/MyGestureEditor_mapping.html>, last visited Jan. 8, 2009, five pages. (XP002511130).

Anonymous. (Nov. 26, 2005). "MyGesture Editor—Gesture Mapping," located at <http://web/archive.org.web/20051126023354/http://www.fingerworks.com/MyGestureEditor_mapping.html>, last visited Jan. 8, 2009, four pages. (XP002509466).

International Search Report mailed Jan. 29, 2009, for PCT Application No. PCT/US2007/089161, filed Dec. 28, 2007, four pages.

Non-Final Office Action mailed Mar. 31, 2011, for U.S. Appl. No. 12/242,654, filed Sep. 30, 2008, nine pages.

Final Office Action mailed Sep. 19, 2011, for U.S. Appl. No. 12/242,654, filed Sep. 30, 2008, 14 pages.

Non-Final Office Action mailed Sep. 23, 2011, for U.S. Appl. No. 11/619,571, filed Jan. 3, 2007, 22 pages.

Final Office Action mailed Mar. 1, 2012, for U.S. Appl. No. 12/242,654, filed Sep. 30, 2008, 10 pages.

Final Office Action mailed Apr. 9, 2012, for U.S. Appl. No. 11/619,571, filed Jan. 3, 2007, 22 pages.

\* cited by examiner

US 9,311,528 B2

GESTURE LEARNING

CROSS-REFERENCE TO RELATED APPLICATIONS

This claims priority to U.S. patent application Ser. No. 11/619,571, titled "Multi-Touch Gesture Dictionary," filed Jan. 3, 2007, and U.S. patent application Ser. No. 11/619,553, titled "Multi-Touch Gesture Dictionary," filed Jan. 3, 2007, both of which are hereby incorporated by reference in their entirety.

This is related to the following U.S. patents and patent applications, each of which is also hereby incorporated by reference in its entirety:

U.S. Pat. No. 6,323,846, titled "Method and Apparatus for Integrating Manual Input," issued Nov. 27, 2001;

U.S. patent application Ser. No. 10/840,862, titled "Multipoint Touchscreen," filed May 6, 2004;

U.S. patent application Ser. No. 10/903,964, titled "Gestures for Touch Sensitive Input Devices," filed Jul. 30, 2004;

U.S. patent application Ser. No. 10/038,590, titled "Mode-Based Graphical User Interfaces for Touch Sensitive Input Devices," filed Jan. 18, 2005;

U.S. patent application Ser. No. 11/367,749, titled "Multi-Functional Hand-Held Device," filed Mar. 3, 2006;

U.S. patent application Ser. No. 11/619,505, titled "Far-Field Input Identification," filed Jan. 3, 2007;

U.S. patent application Ser. No. 11/649,998, titled "Proximity and Multi-Touch Sensor Detection and Demodulation," filed Jan. 3, 2007;

U.S. Pat. No. 6,337,678, titled "Force Feedback Computer Input and Output Device With Coordinated Haptic Elements," issued Jan. 8, 2002.

BACKGROUND

Many attempts have been made over the years to improve the way users interact with computers. In the beginning, cards or tapes with punched holes were used for user input. Punch cards gave way to terminals with alphanumeric keyboards and text displays, which evolved into the modern keyboard, mouse, and graphical-display based graphical user interfaces. Many expect that the use of multi-finger, touch-sensitive user interfaces ("multi-touch interfaces", such as those described in the references incorporated above, will become widely adopted for interacting with computers and other electronic devices, allowing computer input to become even more straightforward and intuitive.

Users of these multi-touch interfaces may make use of hand and finger gestures to interact with their computers in ways that a conventional mouse and keyboard cannot easily achieve. A multi-touch gesture can be as simple as using one or two fingers to trace out a particular trajectory or pattern, or as intricate as using all the fingers of both hands in a complex sequence of movements reminiscent of American Sign Language. Each motion of hands and fingers, whether complex or not, conveys a specific meaning or action that is acted upon by the computer or electronic device at the behest of the user. The number of multi-touch gestures can be quite large because of the wide range of possible motions by fingers and hands. It is conceivable that an entirely new gesture language might evolve that would allow users to convey complex meaning and commands to computers and electronic devices by moving their hands and fingers in particular patterns.

Techniques for teaching these gestures and gesture languages to new users are needed. Techniques that have been proposed include playback of motion trails indicating the gesture, animated hands performing the gesture, and various graphical depictions of gestures and their meanings. Each of these techniques suffers from one or more deficiencies.

For example, a motion trail 100 corresponding to a thumb and two-finger rotate gesture is illustrated in FIG. 1. The paths 101, 102, and 103 can correspond to the thumb, index, and middle finger motions, with the arrowheads indicating the direction of motion. The paths may be color-coded or have other indication of what finger(s) are used. For example, hand icon 104 can be provided and can include dots to indicate what fingers are used. Even if the motion trails are animated, the abstraction level of this teaching technique can still lead to difficulty in comprehension for a user. Additionally, this technique lacks interactivity and feedback. Therefore, this technique does not lend itself to teaching and practice of a particular gesture or group of gestures by a user.

An animated hand gesture (again illustrating a thumb and two finger clockwise rotation gesture) is illustrated in FIG. 2. Animated hand gestures may range in complexity from relatively simple line drawings to complex three-dimensional renderings of the hand. These animated hand gestures can address the abstraction problem to a degree by providing a more tangible representation of the users hand 200. However, this technique may not clearly indicate the path taken by the various hand parts. For example, paths may be obscured by the hand representation. Additionally, this technique also lacks interactivity and feedback that may be beneficial for teaching and practice.

The gesture dictionaries disclosed in U.S. patent application Ser. Nos. 11/619,571 and 11/619,553, each titled "Multi-Touch Gesture Dictionary," and each filed Jan. 3, 2007 (referenced above) can be adapted as described therein to provide a degree of interactivity. For example, a graphical depiction of a gesture performed may be highlighted or otherwise indicated. Additionally, a simple form of feedback arises from the fact that a gesture that is incorrectly executed will cause the wrong command to be displayed. However, this relatively simple level of interactivity and feedback may be better suited for teaching additional gesture "vocabulary" to users that are already somewhat acquainted with some gestures. Gesture learning from ground zero may be enhanced by techniques that incorporate more robust interactivity and feedback.

SUMMARY

The present invention can relate, for example, to a method for teaching gestures. The method can include presenting a display having two display areas, one of which can be a multi-touch monitor window. The multi-touch monitor window can be used to display interactive feedback to a user indicating what gesture the user is performing. The multi-touch monitor window can be overlaid on the first display area or can be a separate window, such as a side-by-side arrangement. If the multi-touch monitor window is overlaid, it can incorporate transparency or translucency that allows the display area behind it to also be perceived.

The interactive feedback can take a variety of forms. For example, the interactive feedback can comprise an animated hand together with one or more motion indicators. The animated hand can be a line drawings, a three-dimensional rendering, a translucent shadow of a hand, or other representation. The motion indicators can include motion trails or other representations, which can also be color-coded. The interactive feedback may also be superimposed with an animated display of a correctly performed gesture so that the user can see the difference, if any, between the gesture he performs and the idealized gesture.

The first display area can be used in conjunction with a variety of application programs. For example, the first display area can be used with a utility, entertainment, or communication application, in which case the feedback provided by the multi-touch monitor window serves as reinforcing feedback. As another example, the first display area can be used in conjunction with a gesture learning application.

The gesture learning application can take a variety of forms. In some embodiments, the gesture learning application can be a game. In other embodiments, it can be an application that presents gestures to be performed to the user in the form of various repetitive drills. The gesture learning application can detect the gesture or gestures performed by the user in response to the presented gesture or gestures and provide feedback indicating whether the gesture or gestures were performed correctly.

The present invention can also relate, for example, to a graphical user interface for a gesture learning application. The graphical user interface can include a main window including an indication of a gesture or sequence of gestures to be performed using a multi-touch interface and a multi-touch monitor window including an interactive feedback mechanism that indicates a gesture or gestures actually performed by the user. To facilitate learning, a sequence of gestures may be presented. These gestures can be arranged according to particular chords, motions, or sequences thereof.

The indication of a gesture or gestures to be performed can take a variety of forms, including an animated hand, one or more motion trails, an iconographic representation, a textual description of the gesture to be performed, a textual description of a command corresponding to the gesture to be performed, and combinations thereof. Similarly, the indication of a gesture or gestures actually performed can also take a variety of forms, including an animated hand, one or more motion trails, an iconographic representation, a textual description of the gesture currently being performed, a textual description of a command corresponding to the gesture currently being performed, a positive feedback indicator, a negative feedback indicator, and combinations thereof. The positive and negative feedback indicators could also be in an audible form.

In other embodiments of the invention, computer systems including one or more applications or graphical user interfaces as described above are provided. The computer systems can take the form of a desktop computer, notebook computer, tablet computer, handheld computer, personal digital assistant, media player, mobile telephone, or the like.

BRIEF DESCRIPTION OF THE DRAWINGS

The aforementioned and other aspects of the invention may best be understood by reference to the following description taken in conjunction with the accompanying drawings in which.

DETAILED DESCRIPTION

Figure 1:
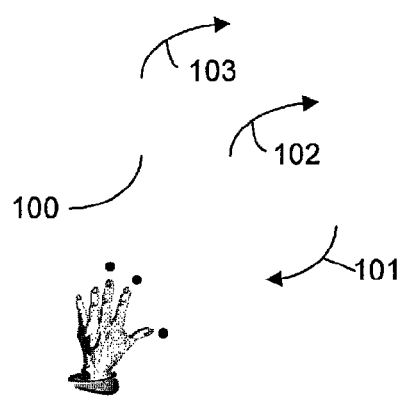
FIG. 1 illustrates a prior art display of gesture motion trails.
Figure 2:
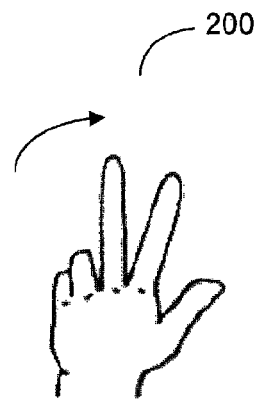
FIG. 2 illustrates a prior art animated display of a hand performing a gesture.

To take full advantage of a multi-touch gesture language, users will need to learn and/or remember the meaning of numerous gestures. Multi-touch gestures may be considered to include at least two phases that, taken together in sequence, signal the beginning and completion of a particular gesture. The first phase of a multi-touch gesture can include presenting a specific combination of hand parts, i.e., fingers, thumbs, etc. in a particular configuration. In some embodiments, this may include placing the hand parts down on the multi-touch surface. The second phase of the gesture can include, for example, motion of the specific hand parts. This motion may take the form of lateral motions such as rotation, translation, scaling (expansion and contraction), etc. Again, in some embodiments, this may comprise moving the hand parts around on the multi-touch surface. In such embodiments, the second phase of the gesture may also comprise vertical motions (relative to the multi-touch surface) such as tapping, double-tapping, etc.

For convenience, the first phase, e.g., the starting position, number, and configuration of all the hand parts used for a particular gesture, will be referred to herein as a chord. Also for convenience, the hand parts will be referred to as fingers, although this also includes thumbs, palm heels, etc. In some embodiments, other touch devices, such as a stylus, can also be used either alone or in conjunction with hand parts. Modifier buttons and keys (such as Ctrl, Alt, Shift, Option, Command, etc.) keys may also be considered as part of the chord. Therefore, in the examples described herein, a chord can include: a set of fingers or hand parts from either or both hands, touch devices, and/or modifier keys, that are put in motion to form a gesture. In many multi-touch systems the chord may uniquely specify a set of gestures that belong to the combination of fingers and orientations making up the chord.

Each of a user's hands acting alone can execute twenty-five or more chords. For example, five fingers that can be independently raised or lowered give rise to thirty-one combinations. Additional chords may be distinguished by whether only the fingertips are in contact with the surface or whether the length of the finger is flattened against the surface. Further chords may be distinguished based on whether the fingertips are placed on the surface close together or spread apart. As noted above, modifier keys (e.g., the Ctrl, Alt, Shift, and Cmd keys of a keyboard) may be used to distinguish different chords. Modifier keys may also include buttons, touch-sensitive or force-sensitive areas, or other toggles located on the device. However, some chords may be more difficult to execute than others, and various identification and classification problems can arise for the device, particularly in the case of closed versus spread fingertips.

Many chords can have at least thirteen different motions associated with them. For example, a two-finger chord (for example, the index and middle fingers) could have specific meaning or action assigned to the lateral motions that include rotation, translation, and scaling. Rotation (clockwise and counter-clockwise) of the two-finger chord gives rise to two unique meanings or actions. Translation (left, right, up, down, and four diagonals) gives rise to at least eight unique meanings or actions. Scaling (contraction or expansion) also gives rise to two meanings or actions. The vertical motion of a chord may comprise lifting the fingers of the chord off the multi-touch surface almost immediately after they had touched down, (e.g., tapping the multi-touch surface with the chord) or multiple taps, etc.

With each hand able to execute twenty-five or more chords, and with each chord having thirteen or more motions associated therewith, there may be over three hundred possible gestures for each hand. Many more gestures are possible if both hands are used together. This gives rise to the gesture language referenced above. Learning a multi-touch gesture language may be facilitated by an interactive application that provides some type of demonstration of the expected hand and finger motion as well as feedback indicating whether the gesture was performed correctly.

One such interactive application will now be described with respect to FIG. 3. A display 300 of a device incorporating a multi-touch input device is displayed. The display may be a touch-screen device that incorporates multi-touch sensing or may be an ordinary display. A computer application may display information is first display area 301. A second display area 302 can be a multi-touch monitor window. Multi-touch monitor window 302 may be overlaid atop the application window and may optionally incorporate transparency or translucency to permit the "obscured" portion of first display area 301 to be perceived by the user. Alternatively, multi-touch monitor window 302 can be separately displayed, for example using a split screen, etc. Multi-touch monitor window 302 can incorporate an interactive feedback mechanism that provides indication to the user of a gesture being performed.

Figure 3:
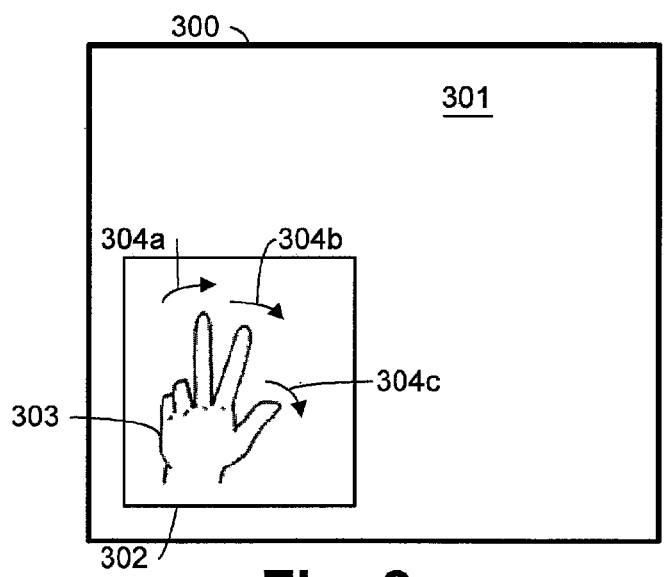
FIG. 3 illustrates a screen display of an interactive gesture learning application according to some embodiments of the present invention.
Figure 4:
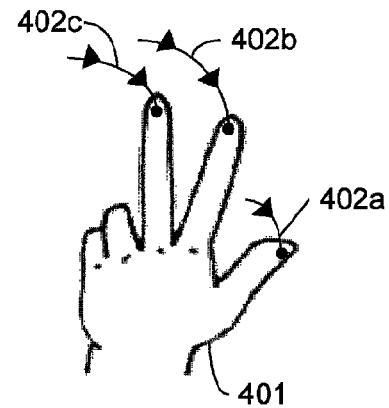
FIG. 4 illustrates an interactive feedback mechanism of an interactive gesture learning application according to some embodiments of the present invention.

As shown in FIG. 3, the interactive feedback mechanism can include an animated hand 303 with motion indications 304a, 304b, and 304c that correspond to the motions of hand parts involved in performing the gesture. The animated hand may take various forms, ranging from a simple line drawing to a three-dimensional rendering. One such form, illustrated in FIG. 4, may be a translucent "shadow" 401 of a hand. This translucency allows motion trails 402a, 402b, and 402c (a form of motion indication) associated with the hand parts to be perceived through shadow 401. The motion trails may also be color-coded to distinguish one from another.

By "interactive feedback mechanism," it is meant that the hand representation 303 or 404 displays to a user the gesture that is currently being performed. In some embodiments, the parameters necessary to provide the animation may be inferred from the contact points 403 of the gesture. Alternatively, the whole hand may be tracked through some form of proximity sensing. The proximity sensing can, for example, take the form of far-field sensing as described in U.S. patent application Ser. No. 11/619,505, titled "Far-Field Input Identification," filed Jan. 3, 2007 (referenced above) or infrared sensing as described in U.S. patent application Ser. No. 11/649,998, titled "Proximity and Multi-Touch Sensor Detection and Demodulation," filed Jan. 3, 2007. In still other embodiments, a camera can be used for hand tracking, as described in U.S. Pat. No. 6,337,678, titled "Force Feedback Computer Input and Output Device With Coordinated Haptic Elements," issued Jan. 8, 2002 (referenced above).

Multi-touch monitor window 302 can be used in connection with various applications being used. For example, display area 301 can display any of a variety of applications, such as utilities, entertainment, communication or other applications, with display area 302 indicating input gestures performed by the user. The feedback provided to the user indicating the gesture performed coupled with the action or command invoked in the application can provide assistance in learning to control application programs using gestures. In some embodiments, the feedback information displayed in the multi-touch monitor window can be superimposed with the animated display of the gesture so that a user can easily perceive the difference between his hand activities and those of the ideal gesture. Additionally, a multi-touch monitor window can be used in conjunction with an application specifically designed to facilitate gesture learning as described in greater detail below.

Figure 5A:
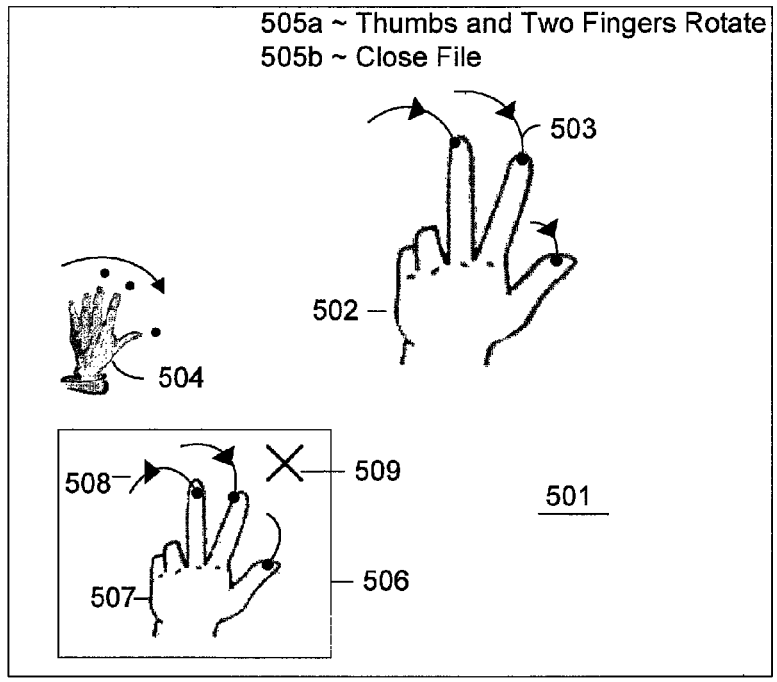
FIGS. 5A and 5B illustrate screen displays of an interactive gesture learning application according to some embodiments of the present invention.
Figure 5B:
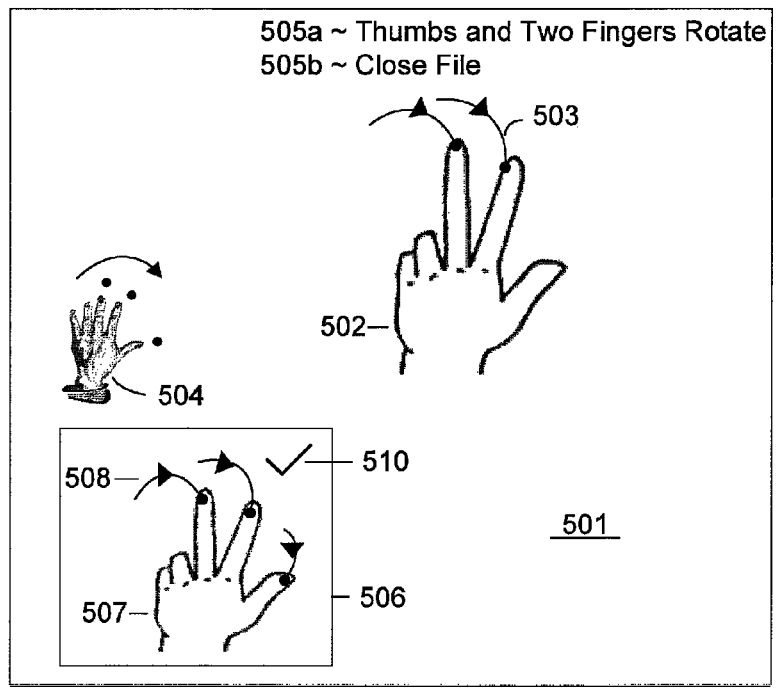

An exemplary gesture learning application display is illustrated in FIGS. 5A and 5B. A main window 501 indicates a gesture to be performed. The gesture to be performed may be indicated in a variety of ways, including, for example, animated hand 502, motion trails 503, an iconographic representation 504, a textual description (which can be either a description of a gesture 505a or of a command performed by the gesture 505b), as well as various combinations of one or more of these or other indications. Multi-touch monitor window 506 displays feedback to the user indicating what the device perceives from a gesture performed by a user. This feedback may include an animated hand 502, motion trails 508, or other suitable representations as described above.

The feedback may also include a negative feedback indicator 509 if the gesture is performed incorrectly or a positive feedback indicator 510 if the gesture is performed correctly. For example, in the illustration of FIG. 5A, the rotate gesture performed by the user was interpreted as a downward stroke and an "X" is displayed to indicate that the gesture was not correctly performed. In the illustration of FIG. 5B, the rotate gesture performed by the user was interpreted correctly and a check-mark is displayed to indicate that the gesture was correctly performed. The feedback indicators may also include audible feedback either in conjunction with or as a substitute for the visible feedback indicators.

Figure 6:
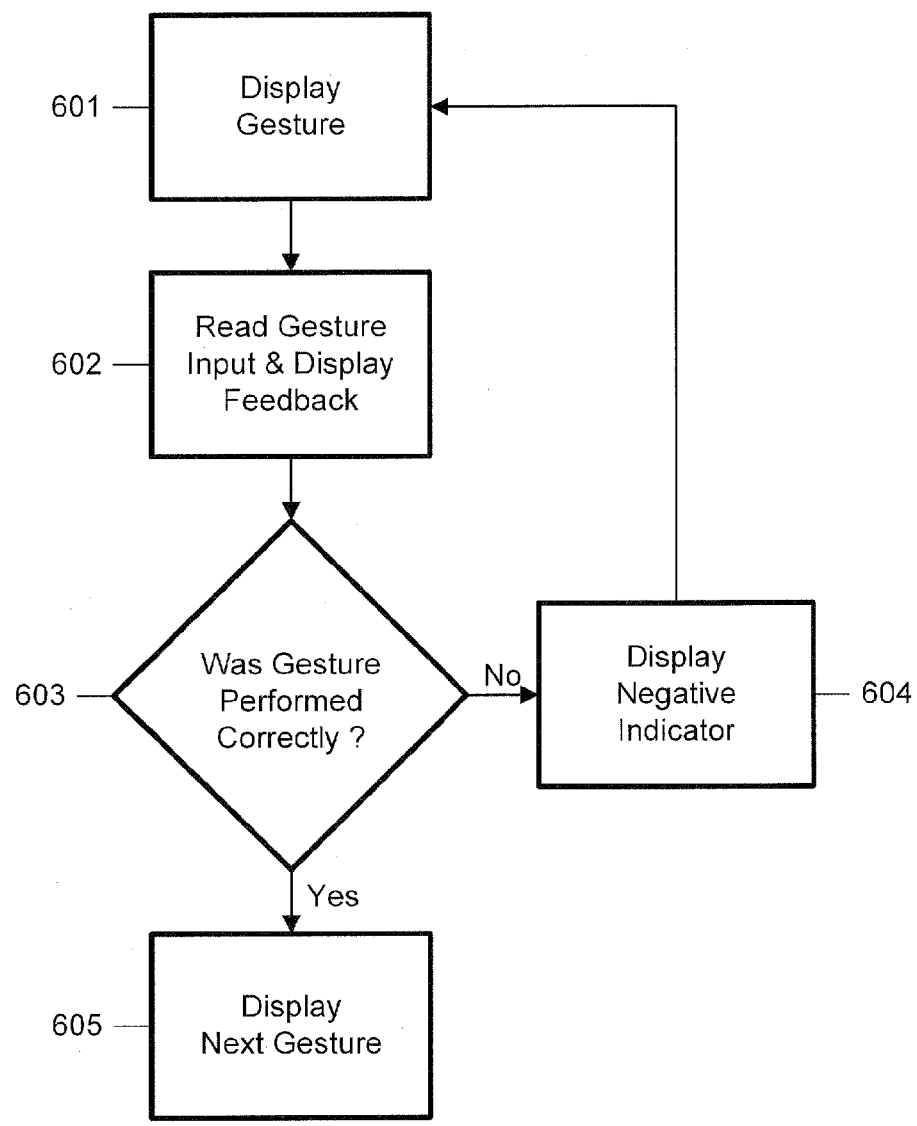
FIG. 6 illustrates a flow chart for an interactive gesture learning application according to some embodiments of the present invention.

A basic flow chart for a gesture learning application corresponding to the displays of FIGS. 5A and 5B is illustrated in FIG. 6. In block 601, a gesture is displayed to the user, e.g., in main window 501. In block 602, the gesture performed by the user is monitored and the feedback displayed in monitor window 506. The gesture performed by the user is then evaluated in block 603 to determine whether it was performed correctly. If not, a negative feedback indicator is displayed (block 604), and the gesture can be demonstrated again (block 601). If the gesture was performed correctly, a positive feedback indication may be provided and/or a next gesture may be displayed (block 605), with the process repeating.

Figure 7A:
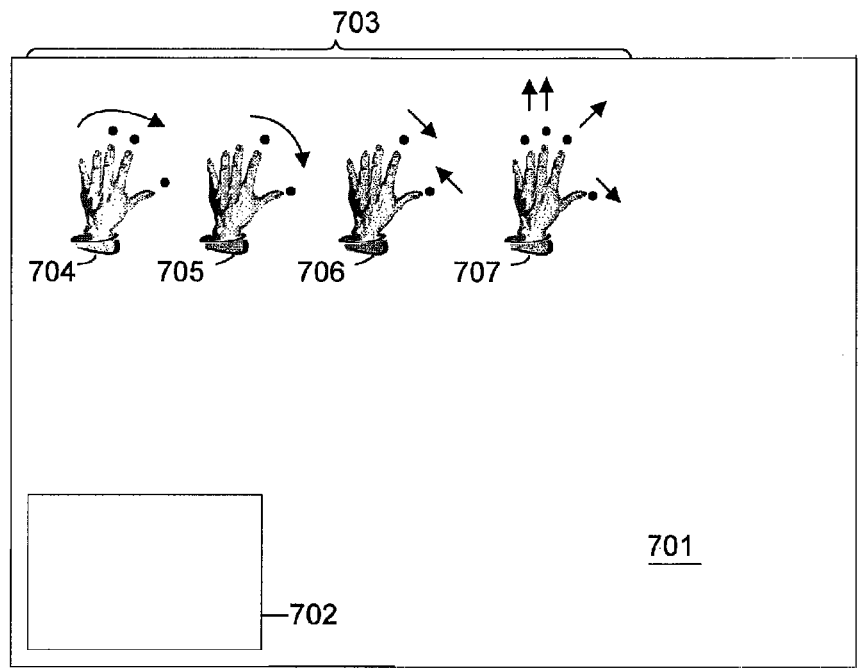
FIGS. 7A and 7B illustrate screen displays of an interactive gesture learning application that permits practice of learned gestures according to some embodiments of the present invention.
Figure 7B:
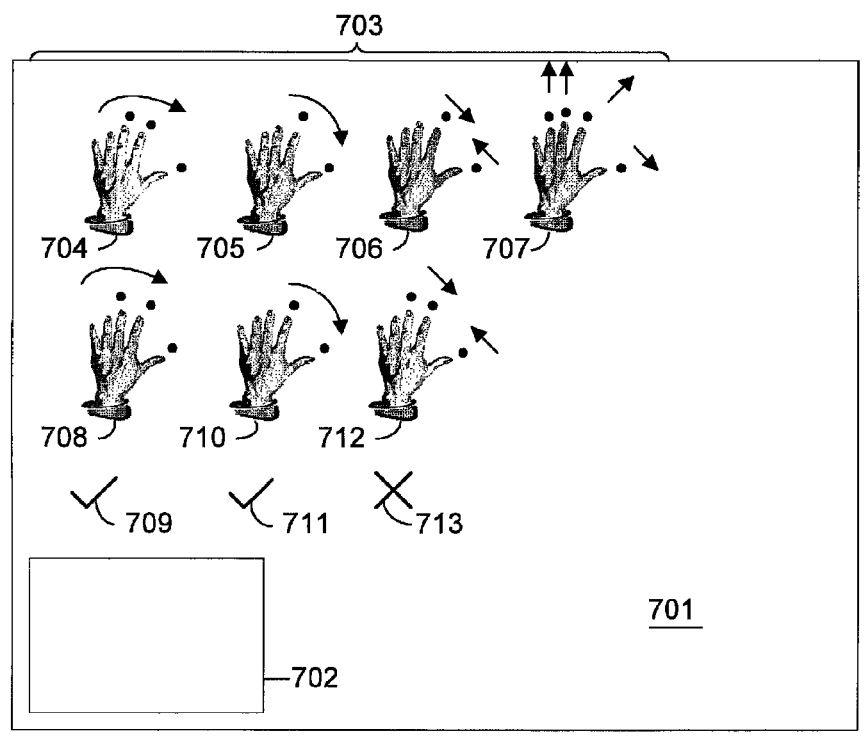
Figure 8:
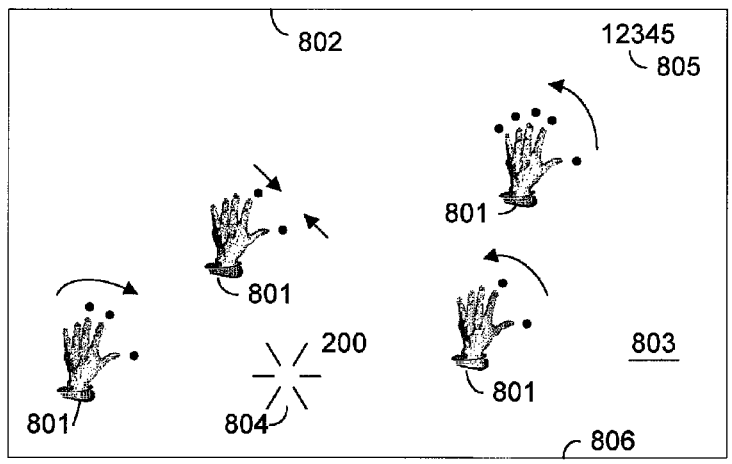
FIG. 8 illustrates a screen display of an interactive gesture learning application in the form of a game according to some embodiments of the present invention.

A gesture learning application may also be configured to permit a user to practice gestures that have been learned. This can add an element of repetition to help reinforce the learning of gestures. An exemplary display for such an application is illustrated in FIGS. 7A and 7B. The display can include a main window 701 and multi-touch monitor window 502. Alternatively, only the main window may be used as other feedback to the user can be provided as will be described below. Main window 701 can be used to present a sequence of gestures 703 to be performed by the user. Arrangement of the sequence of gestures can be organized into lessons corresponding to particular chords or sequences of chords, particular motions or sequences of motions, etc. The sequence of gestures can also include a timing component, either as from the beginning to end of a gesture or the spacing between gestures.

As in the examples above, gestures may be presented in a variety of ways, including animations, motion trails, verbal descriptions of the gesture and/or the command invoked, iconographic representations, etc. The example of FIGS. 7A and 7B uses iconographic representations. The iconographic representations include a schematic hand, a dot indicating the figures used, and a motion arrow indicating the motion to be performed. In the example illustrated, iconographic representation 704 corresponds to a thumb and two finger clockwise rotation gesture. Iconographic representation 705 corresponds to a thumb and forefinger clockwise rotation gesture. Iconographic representation 706 corresponds to a thumb and forefinger pinch gesture. Iconographic representation 707 corresponds to a thumb and three finger expansion gesture. Although the illustrated iconographic representations correspond to a left hand, either right-handed or two-handed gestures could also be used.

As illustrated in FIG. 7B, a user can then perform each of the gestures in the sequence presented. As the gestures are performed, feedback can be provided in the optional multi-touch monitor window 702 as described above. Additionally or alternatively, an iconographic representation corresponding to the gesture performed can be displayed. The iconographic representation can also include positive feedback indication for correctly performed gestures and negative feedback indication for incorrectly performed gestures.

Correct performance of the first two gestures can be indicated by display of an iconographic representation of the gestures performed 708 and 710 that correspond to the iconographic representations 704 and 705 originally presented. Check marks 709 and 711 can serve as a positive feedback indicators. As above, positive feedback could also take other forms, including audible feedback.

Incorrect performance of the third gesture can be indicated by displaying iconographic representation 712, which does not correspond to the originally presented iconographic representation 706. In the illustrated example, instead of a two-finger pinching gesture, a three-finger pinching gesture was performed. An additional negative feedback indication, e.g., "X" 713 can also be displayed. As with the positive feedback indicator, audible feedback can also be used, either in addition to or as a substitute for visual feedback. In cases where a multi-touch monitor window is not displayed, incorrect performance of a gesture can invoke the multi-touch monitor window, which can playback the performed gesture to demonstrate the mistake made by the user.

A gesture learning practice application may also take the form of a game to provide a more satisfying user experience. In one embodiment, the game may take a form similar to the classic SPACE INVADERS® or MISSILE COMMAND® video games. Representations of gestures 801, which can be in any of a variety of written or graphical forms, may descend from the top 802 of screen 803. The representations 801 can be destroyed (804) by correctly executing the represented gesture. Destroying the representation of the gesture can add points (e.g., 200) to the user's score 805. If the representation of the gesture reaches bottom 806 of screen 803 without being destroyed, points may be deducted from the user's score or other penalty.

Figure 9:
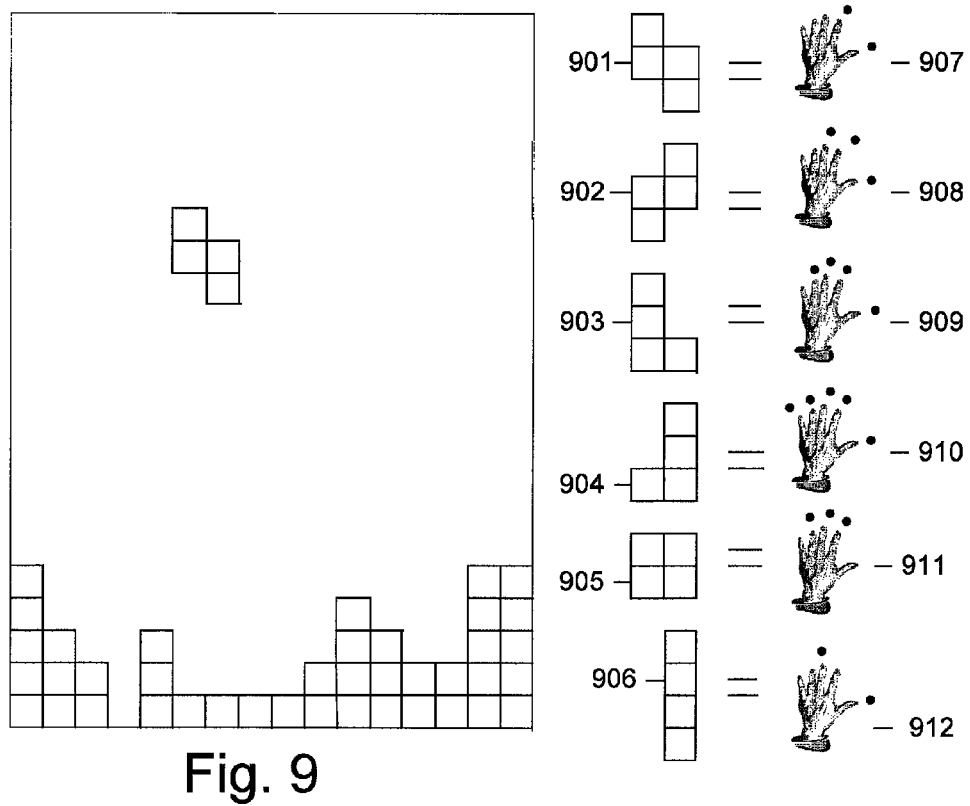
FIG. 9 illustrates a screen display of an interactive gesture learning application in the form of a game according to some embodiments of the present invention.

Another embodiment of a gesture learning game can be similar to the TETRIS® video game. As shown in FIG. 9, the block shapes 901-906 can correspond to particular chords 907-912. Rotation of the pieces can be performed by clockwise and counter-clockwise rotation of the corresponding chord. Dropping of the pieces can be performed by downward strokes. Alternatively, the rotations and dropping can be performed by other motions.

In another embodiment, gesture learning can be incorporated into graphical role-playing and strategy games such as FINAL FANTASY® or CIVILIZATIONS® where each character, vehicle or group of characters is assigned a particular chord, and various gesture motions performed with that particular chord direct the movements, spells, and/or attacks of a character, vehicle, or group of characters. Failure to perform the correct chord results in punishment in the form of unwanted movements, spells or actions by unintended characters, vehicles, or groups of characters. Since the instantly performed chord selects the character, vehicle, or group of characters, with practice the player will be able to switch between characters, vehicles, or groups of characters much more quickly than the traditional method of moving the mouse cursor over or directly touching the desired character, vehicle, or group of characters.

Having described various formats for gesture learning techniques and applications, the following describes how a user may access and interact with such applications. In some embodiments, application programs embodying these techniques may be provided on a computer system the multi-touch gestures interact with. The program may be stored in a memory of a computer system, including solid state memory (RAM, ROM, etc.), hard drive memory, or other suitable memory. A CPU may retrieve and execute the program. The CPU may also receive input through a multi-touch interface or other input devices. In some embodiments, an I/O processor may perform some level of processing on the inputs before they are passed to the CPU. The CPU may also convey information to the user through a display. Again, in some embodiments, an I/O processor may perform some or all of the graphics manipulations to offload computation from the CPU. Also, in some embodiments, a multi-touch interface and display may be integrated into a single device, e.g., a touch screen.

The computer system may be any of a variety of types, including desktop computers, notebook computers, tablet computers, handheld computers, personal digital assistants, media players, mobile telephones, and the like. Additionally, the computer may be a combination of these types, for example, a device that is a combination of a personal digital assistant, media player, and mobile telephone. The gesture learning application may be started by a user using any of a variety of techniques common in GUI-based computer systems.

Many other variations and/or combinations of the embodiments discussed herein are also possible. For example, although the descriptions herein have centered around motions of fingers and hands performed on a surface, the principles herein may be also applied to three-dimensional spatial gestures. It is therefore intended that the following appended claims be interpreted as including all such alterations, permutations, combinations and equivalents.

What is claimed is:
1. A method for teaching gestures performable on a multi touch interface, the method comprising:
 presenting a display on a touch sensing touch screen, the display comprising a first display area and a second display area, the second display area comprising a touch monitor window graphically distinct from and in an area of the touch screen non-overlapping with the first display area;

detecting a practice gesture currently being performed on the touch sensing touch screen in the first display area; and presenting in the touch monitor window an interactive feedback mechanism that indicates an accuracy of the practice gesture currently being performed.

2. The method of claim 1 wherein the touch monitor window is overlaid atop the first display area.

3. The method of claim 2 wherein the touch monitor window incorporates transparency or translucency.

4. The method of claim 1 wherein the touch monitor window is displayed separately from the first display area.

5. The method of claim 1 wherein the interactive feedback mechanism comprises an animated hand together with one or more motion indications.

6. The method of claim 5 wherein the animated hand comprises one or more items selected from the group consisting of: a line drawing, a three-dimensional rendering, and a translucent shadow of a hand.

7. The method of claim 5 wherein the one or more motion indications comprise motion trails.

8. The method of claim 7 wherein the motion trails are color-coded.

9. The method of claim 5 wherein the interactive feedback mechanism has superimposed thereon an animated display of a gesture so that a difference between the gesture currently being performed and an ideal gesture can be perceived.

10. The method of claim 1 wherein the first display area is used in conjunction with a utility, entertainment, or communication application.

11. The method of claim 1 wherein the first display area is used in conjunction with a gesture learning application.

12. The method of claim 11 wherein the gesture learning application is a game.

13. The method of claim 11 wherein:
a gesture to be performed by the user is presented in the first display area; and wherein the method further comprises:
comparing the detected gesture to the gesture to be performed; and
if the detected gesture does not correspond to the gesture to be performed providing a negative feedback indicator; and
if the detected gesture does correspond to the gesture to be performed, providing a positive feedback indicator.

14. The method of claim 11 wherein:
a gesture to be performed by the user is presented in the first display area; and wherein the method further comprises:
comparing the detected gesture to the gesture to be performed; and
if the detected gesture does not correspond to the gesture to be performed providing a negative feedback indicator; and
if the detected gesture does correspond to the gesture to be performed, displaying a next gesture to be performed by the user in the first display area.

15. A graphical user interface display for a gesture learning application, the graphical user interface display comprising:
a main window displayed on a touch sensing touch screen including an indication of a gesture to be performed on the touch screen, the main window configured for detecting a practice gesture;
a touch monitor window graphically distinct from and in an area of the touch screen non-overlapping with the main window, the touch monitor window including an interactive feedback mechanism displayed on the touch screen, the interactive feedback mechanism including an indication of an accuracy of the practice gesture currently being performed.

16. The graphical user interface of claim 14 wherein the indication of a gesture to be performed displayed in the main window includes one or more items selected from the group consisting of: an animated hand, one or more motion trails, an iconographic representation, a textual description of the gesture to be performed, and a textual description of a command corresponding to the gesture to be performed.

17. The graphical user interface of claim 15 wherein the indication of the accuracy of the practice gesture currently being performed includes one or more items selected from the group consisting of: an animated hand, one or more motion trails, an iconographic representation, a textual description of the gesture currently being performed, a textual description of a command corresponding to the gesture currently being performed, a positive feedback indicator, and a negative feedback indicator.

18. The graphical user interface of claim 17 wherein at least one of the positive feedback indicator and the negative feedback indicator comprise an audible indication.

19. The graphical user interface of claim 15 wherein the indication of a gesture to be performed in the main window comprises a sequence of gestures.

20. The graphical user interface of claim 19 wherein the sequence of gestures is arranged according to a particular chord or sequence of chords.

21. The graphical user interface of claim 19 wherein the sequence of gestures is arranged according to a particular motion or sequence of motions.

22. The graphical user interface of claim 19 further comprising at least one of a positive feedback indicator and a negative feedback indicator displayed in the main window.

23. A computer system having a touch interface and a graphical user interface, wherein the computer system includes a computer memory encoded with executable instructions for causing the computer system to:
present a display on a touch sensing touch screen, the display comprising a first display area and a second display area, the second display area comprising a touch monitor window graphically distinct from and in an area of the touch screen non-overlapping with the first display area;
detect a practice gesture currently being performed on the touch sensing touch screen in the first display area; and
present in the touch monitor window an interactive feedback mechanism that indicates an accuracy of the practice gesture currently being performed.

24. The computer system of claim 23 wherein the computer system is selected from the group consisting of a desktop computer, a tablet computer, and a notebook computer.

25. The computer system of claim 23 wherein the computer system comprises at least one of a handheld computer, a personal digital assistant, a media player, and a mobile telephone.

26. The computer system of claim 23, wherein the interactive feedback mechanism comprises an animated hand representative of the practice gesture perceived by the computer system together with one or more motion indications.

27. The computer system of claim 26 wherein the computer system is selected from the group consisting of a desktop computer, a tablet computer, and a notebook computer.

28. The computer system of claim 26 wherein the computer system comprises at least one of a handheld computer, a personal digital assistant, a media player, and a mobile telephone.

29. The computer system of claim 26, wherein the interactive feedback mechanism has superimposed thereon an animated display of an ideal gesture so that a difference between the practice gesture currently being performed and the ideal gesture can be perceived.

30. The computer system of claim 29 wherein the computer system is selected from the group consisting of a desktop computer, a tablet computer, and a notebook computer.

31. The computer system of claim 29 wherein the computer system comprises at least one of a handheld computer, a personal digital assistant, a media player, and a mobile telephone.

32. A computer system of claim 23 wherein the first display area is used in conjunction with a gesture learning application.

33. The computer system of claim 32 wherein the computer system is selected from the group consisting of a desktop computer, a tablet computer, and a notebook computer.

34. The computer system of claim 32 wherein the computer system comprises at least one of a handheld computer, a personal digital assistant, a media player, and a mobile telephone.

35. The computer system of claim 32, wherein:
the practice gesture to be performed is presented in the first display area; and wherein the executable instructions further cause the computer system to:
compare the detected practice gesture to the gesture to be performed; and
if the detected practice gesture does not correspond to the gesture to be performed, provide a negative feedback indicator; and
if the detected gesture does correspond to the gesture to be performed, provide a positive feedback indicator.

36. The computer system of claim 35 wherein the computer system is selected from the group consisting of a desktop computer, a tablet computer, and a notebook computer.

37. The computer system of claim 35 wherein the computer system comprises at least one of a handheld computer, a personal digital assistant, a media player, and a mobile telephone.

38. The computer system of claim 32, wherein:
the gesture to be performed is presented in the first display area; and wherein the executable instructions further cause the computer system to:
compare the detected practice gesture to the gesture to be performed; and
if the detected practice gesture does not correspond to the gesture to be performed provide a negative feedback indicator; and
if the detected gesture does correspond to the gesture to be performed, display a next gesture to be performed in the first display area.

39. The computer system of claim 38 wherein the computer system is selected from the group consisting of a desktop computer, a tablet computer, and a notebook computer.

40. The computer system of claim 38 wherein the computer system comprises at least one of a handheld computer, a personal digital assistant, a media player, and a mobile telephone.

41. A computer system having a touch interface and a graphical user interface, wherein the computer system includes a computer memory encoded with executable instructions for causing the computer system to generate a graphical user interface, the graphical user interface comprising:
a main window displayed on a touch sensing touch screen including an indication of a gesture to be performed on the touch screen, the main window configured for detecting a practice gesture; and
a touch monitor window graphically distinct from and in an area of the touch screen non-overlapping with the main window, the touch monitor window including an interactive feedback mechanism displayed on the touch screen, the interactive feedback mechanism including an indication of an accuracy of the practice gesture currently being performed.

42. The computer system of claim 41 wherein the computer system is selected from the group consisting of a desktop computer, a tablet computer, and a notebook computer.

43. The computer system of claim 41 wherein the computer system comprises at least one of a handheld computer, a personal digital assistant, a media player, and a mobile telephone.

44. The computer system of claim 41 wherein the indication of a gesture to be performed displayed in the main window includes one or more items selected from the group consisting of: an animated hand, one or more motion trails, an iconographic representation, a textual description of the gesture to be performed, and a textual description of a command corresponding to the gesture to be performed.

45. The computer system of claim 44 wherein the computer system is selected from the group consisting of a desktop computer, a tablet computer, and a notebook computer.

46. The computer system of claim 44 wherein the computer system comprises at least one of a handheld computer, a personal digital assistant, a media player, and a mobile telephone.

47. The computer system of claim 41, wherein the indication of the accuracy of the practice gesture currently being performed includes one or more items selected from the group consisting of: an animated hand, one or more motion trails, an iconographic representation, a textual description of the gesture currently being performed, a textual description of a command corresponding to the gesture currently being performed, a positive feedback indicator, and a negative feedback indicator.

48. The computer system of claim 47 wherein the computer system is selected from the group consisting of a desktop computer, a tablet computer, and a notebook computer.

49. The computer system of claim 47 wherein the computer system comprises at least one of a handheld computer, a personal digital assistant, a media player, and a mobile telephone.

50. A mobile telephone having a touch interface and a graphical user interface, wherein the mobile telephone includes the computer system of claim 23.

51. The mobile telephone of claim 50 wherein the interactive feedback mechanism comprises an animated hand together with one or more motion indications.

52. The mobile telephone of claim 51 wherein the interactive feedback mechanism has superimposed thereon an animated display of a gesture so that a difference between the gesture currently being performed and an ideal gesture can be perceived.

53. The mobile telephone of claim 50 wherein the first display area is used in conjunction with a gesture learning application.

54. The mobile telephone of claim 53 wherein:
a gesture to be performed is presented in the first display area; and wherein the executable instructions further cause the mobile telephone to:
compare the detected gesture to the gesture to be performed; and
if the detected gesture does not correspond to the gesture to be performed provide a negative feedback indicator; and
if the detected gesture does correspond to the gesture to be performed, provide a positive feedback indicator.

55. The mobile telephone of claim 53 wherein:
a gesture to be performed is presented in the first display area; and wherein the executable instructions further cause the mobile telephone to:
compare the detected gesture to the gesture to be performed; and
if the detected gesture does not correspond to the gesture to be performed provide a negative feedback indicator; and
if the detected gesture does correspond to the gesture to be performed, display a next gesture to be performed in the first display area.

56. A mobile telephone having a touch interface and a graphical user interface, wherein the mobile telephone includes the computer system of claim 41.

57. The mobile telephone of claim 56 wherein the indication of a gesture to be performed displayed in the main window includes one or more items selected from the group consisting of: an animated hand, one or more motion trails, an iconographic representation, a textual description of the gesture to be performed, and a textual description of a command corresponding to the gesture to be performed.

58. The mobile telephone of claim 56 wherein the indication of the accuracy of the practice gesture currently being performed includes one or more items selected from the group consisting of: an animated hand, one or more motion trails, an iconographic representation, a textual description of the gesture currently being performed, a textual description of a command corresponding to the gesture currently being performed, a positive feedback indicator, and a negative feedback indicator.

59. The computer system of claim 23, wherein the detected practice gesture is a touch gesture.

60. The computer system of claim 41, wherein the detected practice gesture is a touch gesture.

* * * * *